(No Model.)
J. B. SECOR.
CLUTCH DEVICE.
No. 248,889. Patented Nov. 1, 1881.
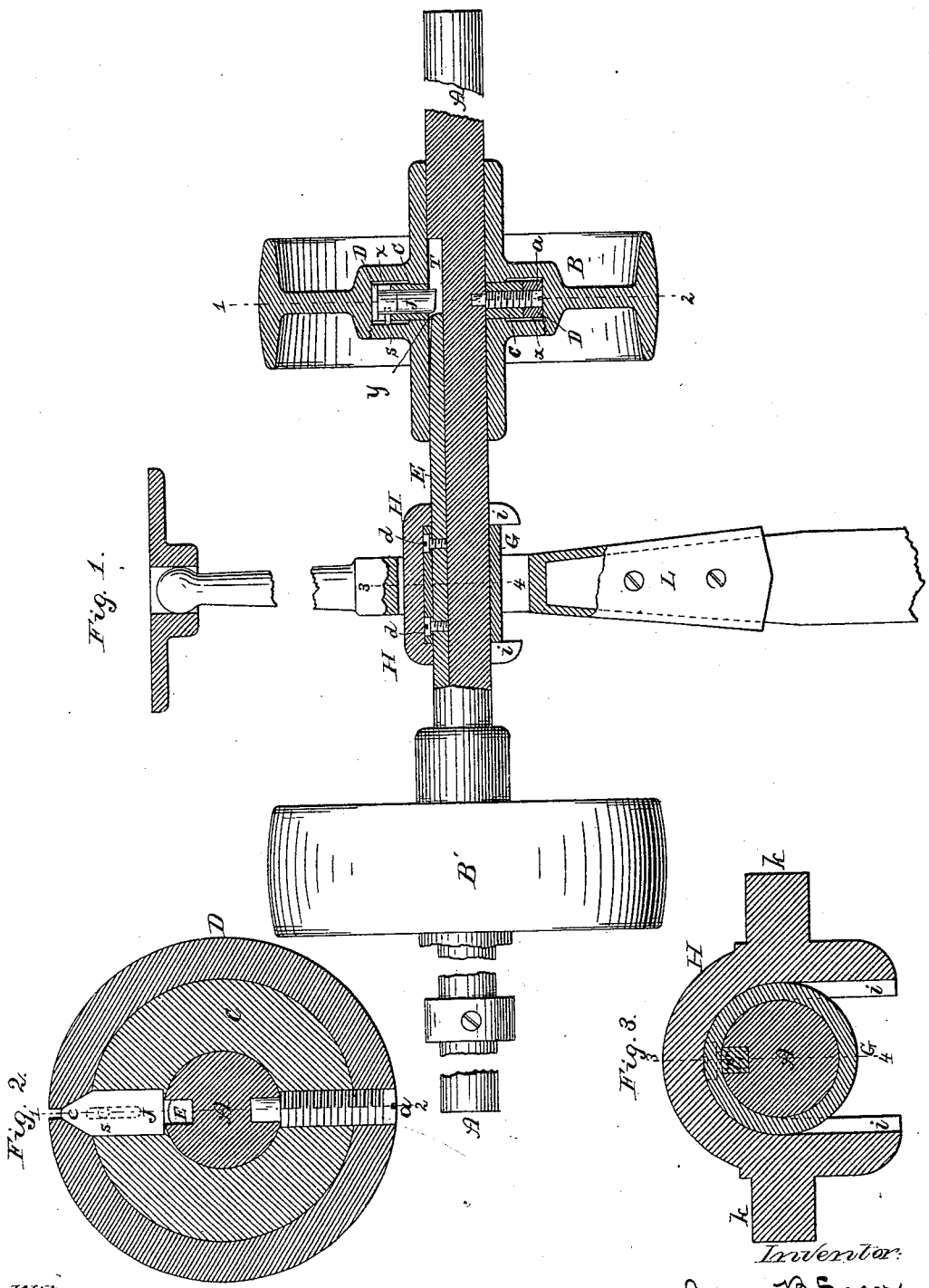
Witnesses:
J. W. Garner
William Paxton
Inventor:
Jerome B. Secor,
By his Attorney
Chas. E. Foster.

UNITED STATES PATENT OFFICE.

JEROME B. SECOR, OF BRIDGEPORT, CONNECTICUT.

CLUTCH DEVICE.

SPECIFICATION forming part of Letters Patent No. 248,889, dated November 1, 1881.

Application filed August 12, 1881. (No model.)

*To all whom it may concern:*

Be it known that I, JEROME B. SECOR, of Bridgeport, Fairfield county, Connecticut, have invented an Improved Clutch Device, of which the following is a specification.

My invention is a clutch device constructed, as fully described hereinafter, so as to secure a pulley to its shaft or release the same by the expansion or contraction of a ring encircling the shaft.

In the drawings, Figure 1 is an elevation showing my improved clutch device in connection with a shaft and two pulleys; Fig. 2, an enlarged cross-section on the line 1 2, Fig. 1; Fig. 3, an enlarged cross-section on the line 3 4, Fig. 1.

A represents a shaft, and B B' pulleys, the shaft and pulleys being used with or as parts of any machine or apparatus in which it is necessary to readily connect the pulley to or loosen it upon the shaft. In the pulley is a recess or chamber, $x$, adapted to receive a split ring, D, which may surround a collar, $c$, on the shaft, and is secured thereto by a bolt, $a$, which secures the collar to the shaft, the parts being so proportioned that when the split ring closely clamps the collar the pulley will revolve freely on the shaft; but when the ring is expanded with its periphery in frictional contact with the inside of the chamber $x$, the pulley and shaft will be firmly connected, and one must move with the other.

To expand the ring, I show a sliding pin, J, arranged within an opening in the collar, and with a wedge-like end, $e$, which lies between beveled ends of the ring D, and when forced outward expands the latter.

Different means may be employed for moving the pin radially, as levers, cams, or toggle-joints. I prefer, however, to use a wedge-like key, E, sliding in a groove, $y$, in the shaft, beneath the end of the pin J, grooved to receive it, and serving to force the latter radially between the ends of the split ring. A stud, $s$, prevents the pin J from turning. To slide the key E, I employ a sleeve, G, bolted to the key by screw-pins $d$, the said sleeve turning in a hood, H, which has side flanges, $i$, and trunnions $k$, the latter fitting sockets in a shifting-lever, L, pivoted at the upper end to any suitable support.

By swinging the lever the key is slid back and forth and the pulleys fastened and unfastened, and by making the key wedge-shaped at both ends it may operate the clutches of two pulleys, B B', as shown.

I claim—

1. The combination, in a friction-clutch, of a solid shaft, A, having a collar, $c$, wheel B, recessed to receive said collar, and a radial split ring surrounding the collar, a pin, J, fitting a recess in the collar, and appliances, substantially as described, whereby the pin is moved radially to expand the ring, substantially as set forth.

2. The combination of the slotted shaft, collar, split ring, pin, recessed pulley, key E, fitting the slot in the shaft A, and a sleeve secured to said key, and appliances for moving the sleeve on the shaft, substantially as set forth.

3. The combination, with the slotted shaft, collars, pulleys B B', rings, and pins J J, of a double-wedge-ended key, E, fitting the slot in the shaft, and appliances, substantially as described, for sliding it, substantially as specified.

In testimony whereof I have signed my name to this specification in the presence of two subscribing witnesses.

JEROME B. SECOR.

Witnesses:
CHARLES E. FOSTER,
H. F. NORCROSS.